J. W. HAINES.
Silvered Glass Door Knobs.
No. 8,139. Reissued March 26, 1878.
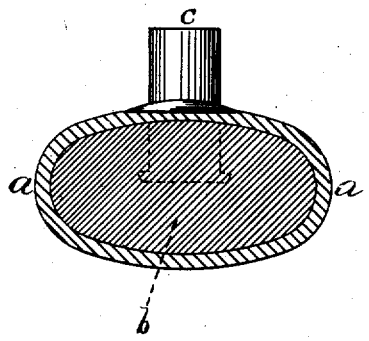
WITNESSES
John E. Fleming
B. N. Williams
INVENTOR
John W. Haines
By his Attys.
Henry W. Williams & Co.
N. PETERS, PHOTO-LITHOGRAPHER, WASHINGTON, D. C.

UNITED STATES PATENT OFFICE.

JOHN W. HAINES, OF CAMBRIDGEPORT, MASSACHUSETTS.

IMPROVEMENT IN SILVERED-GLASS DOOR-KNOBS.

Specification forming part of Letters Patent No. 141,504, dated August 5, 1873; Reissue No. 8,139, dated March 26, 1878; application filed November 16, 1877.

*To all whom it may concern:*

Be it known that I, JOHN W. HAINES, of Cambridgeport, in the county of Middlesex and State of Massachusetts, have invented certain new and useful Improvements in Silvered-Glass Knobs, of which the following is a specification.

The nature of my invention relates to an improvement in glass door-knobs, and in the means of attaching the same to the metal shank; and it consists in filling the glass shell with cement for the purposes of securing the knob to the metallic shank and firmly holding it immovably therein, for protecting the silver lining, and to show the defects in the silvering, the whole making a solid and substantial knob, which is not easily fractured, and in which the shank is firmly and solidly held.

The accompanying drawing represents a sectional view of my knob with its metallic shank attached.

*a* represents the glass shell, which may be made of any suitable thickness, and blown or pressed into its shape. *b* represents a mass of cement, filling the interior of said knob or shell *a*. *c* is a metallic shank.

It has been customary, in attaching metallic shanks to glass door-knobs, to attach the said shanks to the outside of the knob, over a neck or shank of glass projecting from the knob. In this case the shank *c* passes through an opening in the knob, and projects into the center of the mass of cement *b*. By this means the shank may be made as small as desired, and there is no danger of its turning or twisting in the knob, the cement adhering to the shank and to the knob and hardening therein. Thus it will be seen that the shank is prevented from loosening by the snugly-fitting hole in the knob, and from turning by the mass of cement surrounding its interior end.

The glass shell *a* is silvered on its inside with a solution of nitrate of silver dissolved in ammonia, distilled water, and tartaric acid or sugar. The knob is filled with this solution after having been filtered, and then heat is applied to the knob, which causes the silver held in the solution to be deposited upon the glass. This silver may be deposited either evenly or very unevenly over the surface of the glass, according to circumstances.

This composition is very sensitive, and has to be properly prepared, or else its imperfections will very soon make themselves manifest, and ruin the beautiful appearance of the knob.

Heretofore there has been no means of testing the composition, either as to its qualities or as to whether it has adhered evenly over the whole surface of the inside of the shell or not, and the knobs have been secured to the shanks, as far as these two points are concerned, merely upon guess-work. If the composition were right, and it were allowed to fully dry before closing up the opening, and there were no moisture in the atmosphere, then all were well. But if the composition were not right—if it had not evenly adhered to the shell; if it were not fully dry before the shell was sealed up; or if the atmosphere were filled with moisture from rain, fog, or other causes—then the silver were sure to oxidize, and in a very short time entirely ruin the appearance of the knob.

Attempts have been made to prevent this oxidation by hermetically sealing the knob and shank together by some composition; but owing to the contraction and expansion of the parts from heat and cold, or by pulling or striking against them, this joint will sooner or later become loose, and then, moist air getting in, the oxidation at once begins.

In order to prevent this oxidation, and show the defects in the adhesion of the silver over the surface, as well as to secure the shank to the knob, and to make the knob more solid and less liable to break, as above alluded to, I pour the shell full of liquid cement, which expels every particle of air, and, in hardening, binds the shank firmly to the shell. Thus filled, the knob becomes, practically, a solid glass knob, the cement serving to back up the silver, so as to prevent it from all injury whatever, and as a background against which every defect, either in the composition itself or in the adhesion of the silver to the surface of the knob, is plainly shown, and thus I am enabled to detect all imperfect work in time to prevent it from being thrown upon the market.

Having thus fully described my invention, what I claim, and desire to secure by Letters Patent, is—

A silver-lined glass knob, having a mass of cement placed within the same for the purpose of protecting the silver lining and attaching the shank securely to the knob.

JOHN W. HAINES.

Witnesses:
HENRY W. WILLIAMS,
B. W. WILLIAMS.